(12) United States Patent
Tatenuma et al.

(10) Patent No.: US 7,397,236 B2
(45) Date of Patent: Jul. 8, 2008

(54) MAGNETIC DETECTOR

(75) Inventors: Yoshinori Tatenuma, Tokyo (JP); Masahiro Yokotani, Tokyo (JP); Izuru Shinjo, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 11/002,234

(22) Filed: Dec. 3, 2004

(65) Prior Publication Data

US 2005/0270018 A1  Dec. 8, 2005

(30) Foreign Application Priority Data

Jun. 8, 2004  (JP) .......................... P2004-169995

(51) Int. Cl.
  *G01B 7/14*  (2006.01)
  *G01B 7/30*  (2006.01)
  *G01R 33/02*  (2006.01)

(52) U.S. Cl. ................... 324/207.21; 324/252

(58) Field of Classification Search ................
   324/207.21–207.22, 207.24–207.25, 174,
   324/235, 252; 338/32 R; 123/612, 617
   See application file for complete search history.

(56) References Cited

U.S. PATENT DOCUMENTS

| | | | | |
|---|---|---|---|---|
| 4,835,509 A | * | 5/1989 | Yoshino et al. | ........... 338/32 R |
| 5,057,678 A | * | 10/1991 | Ichikawa | ..................... 235/449 |
| 6,111,403 A | * | 8/2000 | Yokotani et al. | ....... 324/207.21 |
| 6,177,793 B1 | * | 1/2001 | Shinjo et al. | ........... 324/207.25 |
| 6,366,079 B1 | * | 4/2002 | Uenoyama | ............. 324/207.21 |
| 6,577,122 B2 | * | 6/2003 | Yokotani et al. | ....... 324/207.21 |
| 6,630,821 B2 | * | 10/2003 | Shinjo et al. | ........... 324/207.21 |
| 6,819,101 B2 | | 11/2004 | Yokotani et al. | |

FOREIGN PATENT DOCUMENTS

| | | |
|---|---|---|
| DE | 101 27 754 A1 | 1/2003 |
| DE | 103 33 249 A1 | 3/2004 |
| JP | 2004-69546 A | 3/2004 |

* cited by examiner

*Primary Examiner*—Reena Aurora
(74) *Attorney, Agent, or Firm*—Sughrue Mion, PLLC

(57) ABSTRACT

The invention provides a magnetic detector that exerts no influence on detection accuracy of a magnetic movable body, being a detected body, even if relative positions of magnetic resistance elements and a magnet are out of alignment due to variation occurred in manufacturing process. A magnetic detector includes: a magnetic field detection part constructed of at least two magnetic resistance elements; a magnet for applying a magnetic field to the magnetic resistance elements; a magnetic movable body for changing the magnetic field that is generated by the magnet; and a processing circuit part for outputting a signal based on the change in resistance values of the magnetic resistance elements due to the change in the magnetic field; and in which a shape of the magnetic resistance elements is symmetric with respect to a point.

8 Claims, 8 Drawing Sheets

MAGNETIC DETECTOR

BACKGROUND OF THE INVENTION

1. Field of the Invention

The present invention relates to a magnetic detector employing a giant magnetic resistance element (hereinafter, it is referred to as GMR element) acting as magnetoelectric transformation device.

2. Description of the Related Art

The GMR element is a laminate formed of alternately laminated magnetic layers and non-magnetic layers of a thickness of several angstroms to dozens of angstroms, being a so-called artificial grid film. (Fe/Cr)n, (Permalloy/Cu/Co/Cu)n, and (Co/Cu)n are known as this artificial grid film (n means the number of laminates).

It is a recent trend that the following magnetic detection method is employed for use in on-vehicle rotary sensor and the like. In this magnetic detection method, electrodes are formed at each terminal of a magnetic resistance segment constructed of the above-mentioned GMR element to constitute a bridge circuit, a power supply of a constant voltage and a constant current is connected between these two opposed electrodes of this bridge circuit, and a change in resistance values of the magnetic resistance segment is transformed into a change in voltages to detect a change in magnetic fields acting on this magnetic resistance element.

In the Japanese Patent Publication (unexamined) No. 69546/2004, such a conventional magnetic detector is disclosed, which is hereinafter described referring to the drawings. FIG. 1(a), (b), (c) and (d) show explanatory views of a constitution of a conventional magnetic detector disclosed in the Japanese Patent Publication (unexamined) No. 69546/2004. In the drawing, FIG. 1(a) is a perspective view, FIG. 1(b) is a top plan view, and FIG. 1(c) is an enlarged view of a magnetic resistance segment.

With reference to FIG. 1, reference numeral 1 designates a magnetic movable body, for example, a gear that includes protrusions on a circumference of a disk, and has a shape required for changing a magnetic field. Numeral 2 designates a processing circuit part in which a circuit is printed on the surface of a board. Numerals 2a and 2b designate magnetic resistance segments. Numeral 3 designates a magnet. Numeral 4 designates a rotary axis of the magnetic movable body 1. When this rotary axis 4 rotates, the magnetic movable body 1 also rotates in synchronization. In addition, the magnetic resistance segments 2a and 2b are shown respectively in one black block in FIGS. 1(a) and (b), and a shape (pattern) of the magnetic resistance segment is shown in an enlarged manner in FIG. 1(c).

FIG. 2 shows constitution of processing circuit part 2 of the above-mentioned conventional magnetic detector. With reference to FIG. 2, the processing circuit part 2 consists of a wheatstone bridge circuit 11 including two magnetic resistance segments (GMR elements) 2a and 2b, a differential amplifier circuit 12, a comparator circuit 13, and an output circuit 14. In addition, numeral 151 designates a transistor, numeral 152 designates an output terminal, VCC designates a constant voltage, and Vref designates a reference voltage.

With reference to FIG. 2, a constant voltage VCC is applied to a bridge circuit constituted of the magnetic resistance segments 2a and 2b fixed resistors 2c and 2d, and a change in resistance values of the magnetic resistance segments 2a and 2b caused by a change in magnetic fields is transformed into a change in voltages. The mentioned signals having been changed in voltage are amplified by the differential amplifier circuit 12, and are inputted to the comparator circuit 13. The signals having been compared with a predetermined reference voltage Vref by the comparator circuit 13 are transformed into a final output of "0" or "1" (=VCC) by the transistor 151 of the output circuit 14, and are outputted from the output terminal 152.

Now, operations of the conventional magnetic-detector are described referring to the drawings. FIG. 3 is a timing chart showing the operations of the conventional magnetic detector. In this drawing, (a) shows positions of the magnetic movable body 1; (b) shows resistance values of the magnetic resistance segments 2a and 2b; (c) shows outputs from the differential amplifier circuit 12; and (d) shows final outputs respectively.

When the magnetic movable body 1 shown in FIG. 1 rotates about the rotary axis 4, magnetic fields to be applied to the magnetic resistance segments 2a and 2b change. Further, as shown in FIGS. 3(a) and (b), the change in resistances corresponding to a magnetic field to be applied to the magnetic resistance segments 2a and 2b comes out in accordance with a shape of the magnetic movable body 1.

Furthermore, as shown in FIG. 3(c), outputs from the differential amplifier circuit 12 can be obtained due to the change in the above-mentioned resistance values. Then, as shown in FIG. 3(d), the output form of the differential amplifier circuit 12 is subject to a waveform shaping by the comparator circuit 13, and final output signals of "1" or "0" can be obtained corresponding to a shape of the magnetic movable body 1.

However, recently, there has been an increasing demand for higher detection accuracy in the above-described magnetic detector; whereas, there is a limit in achieving higher accuracy in detecting positions of the concave or convex parts of the magnetic movable body 1 due to variation in relative positions between the magnetic resistance segments 2a, 2b and the magnet 3 that occurs in the manufacturing process.

FIGS. 4(a) and (b) schematically show cases where relative positions between the magnetic resistance segments 2a, 2b and the magnet 3 are both arranged with high accuracy, and FIGS. 4(c) and (d) show cases where relative positions thereof are both out of alignment. FIGS. 4(a) and (b) are examples of a magnetic detector arranged with high accuracy, and in which (a) shows a case of the magnetic movable body 1 being close to the magnetic resistance segments 2a and 2b and (b) shows a case of the magnetic movable body 1 being apart from the magnetic resistance segments 2a and 2b. In both cases, in-plane magnetic fields to be applied to the magnetic resistance segments 2a and 2b are equal. That is, a vertical magnetic field and a horizontal magnetic field with respect to the magnetic resistance segments are equivalent.

On the other hand, as shown in FIGS. 4(c) and (d), in the case where a positional relation between the magnetic resistance segments 2a, 2b, and the magnet 3 is misaligned, in-plane magnetic fields to be applied to the magnetic resistance fields 21, 2b are unequal. That is, as for the magnetic resistance segment 2a, a horizontal magnetic field component comes to be more intense to a long side thereof. On the contrary, as for the magnetic resistance segment 2b, a vertical magnetic field component comes to be more intense to a long side thereof. Therefore, a vertical magnetic field and a horizontal magnetic field with respect to the magnetic resistance segments 2a, 2b are unequal.

Now, features of a magnetic field to be applied and a change in resistance values of a GMR element, being a magnetic resistance element, are described. The GMR element is an element magnetic-sensitive in plane, and has a considerably large MR effect (rate of MR change) as compared with a magnetic resistance element (MR element); and with which element being dependent on only a relative angle between directions of magnetization of the adjacent magnetic layers, the same change in resistance values can be obtained even if a direction of an external magnetic field has any angular difference with respect to current.

FIGS. 5(a) and (b) show relations between the intensity of a magnetic field of a GMR element and a resistance value of a GMR element. FIG. 5(a) shows a case where relative positions between the magnetic resistance segments 2a, 2b and the magnet 3 are arranged with high accuracy. FIG. 5(b) shows the case of the foregoing relative positions being out of alignment. In the GMR element, with respect to a magnetic field to be applied in plane, a difference is produced between resistance values of the GMR element due to the action of magnetic fields in vertical direction (direction indicated by the arrow A of FIG. 4(a)) and a horizontal direction (direction indicated by the arrow B of FIG. 4(a)) relative to a shape (pattern) of the GMR element. With reference to FIGS. 5(a) and (b), a thick line indicates a parallel magnetic field to be applied to a GMR pattern, and a thin line indicates a vertical magnetic field to be applied to a GMR pattern.

Arrows of FIG. 5(a) indicate ranges of a resistance value and a magnetic field of a GMR element in the case where in-plane magnetic fields shown in FIG. 4 are equal or even, and show that these ranges are located at the halfway point of the vertical magnetic field and the horizontal magnetic field. Furthermore, arrows of FIG. 5(b) indicate ranges of a magnetic field and a resistance of a GMR element in the case where in-plane magnetic fields shown in FIGS. 4(c) and (d) are unequal or uneven, and show that the magnetic resistance segment 2a possesses a larger horizontal magnetic field and the magnetic resistance segment 2b possesses a larger vertical magnetic field. In the case where in-plane magnetic fields are unequal or uneven as shown in FIG. 5(b), a difference in the range of resistance value change comes out between the magnetic resistance segment 2a and the magnetic resistance segment 2b. That is, the range of resistance change in the magnetic resistance segment 2a becomes lower than the range of resistance change in the magnetic resistance segment 2b.

Operations of a magnetic detector in the case where the magnetic resistance segments 2a, 2b and the magnet 3 are out of alignment are described referring to FIG. 6. In FIG. 6, (a) shows positions of the magnetic movable body 1, (b) shows resistance values of the magnetic resistance segments 2a, 2b, (c) shows outputs from the differential amplifier circuit 12, and (d) shows final outputs, respectively.

As shown in FIGS. 6(c) and (d), a difference is generated in the changes of resistance value of the GMR element, and an output waveform from the differential amplifier circuit 12 shifts to one side. Since a voltage value of the comparator circuit 13 is not changed, displacement of output signals comes out as compared with the case where the magnetic resistance segments 2a, 2b and the magnet 3 are in alignment, resulting in considerable reduction of detection accuracy.

SUMMARY OF THE INVENTION

The present invention was made to solve the above-described problems, and has an object of obtaining a magnetic detector having consistent detection accuracy of a magnetic movable body, being a detected body, even if relative position between magnetic resistance elements and a magnet is out of alignment due to variation occurred in manufacturing process.

A magnetic detector according to the invention includes: a magnetic field detecting part constituted of at least two magnetic resistance elements, a magnet for applying a magnetic field to the mentioned magnetic resistance elements, a magnetic movable body for changing a magnetic field that is generated by the mentioned magnet, and a processing circuit part for outputting a signal based on change in resistance values of the mentioned magnetic resistance elements due to change in the mentioned magnetic field; and in which a shape of the mentioned magnetic resistance elements is symmetric with respect to a point.

As a result, it is possible to eliminate the influence of variation in manufacturing on detection accuracy of the rotary movable body.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1(a), (b) and (c) are views each showing a constitution of a conventional magnetic detector, and in which FIG. 1(a) is a perspective view, FIG. 1(b) is a top plan view, and FIG. 1(c) is an enlarged view of a magnetic resistance segment.

FIGS. 7(a), (b) and (c) are views each showing constitution of a magnetic detector according to Embodiment 1 of the present invention, and in which FIG. 7(a) is a perspective view, FIG. 7(b) is a top plan view, and FIG. 7(c) is an enlarged view of a magnetic resistance segment.

DETAILED DESCRIPTION OF THE INVENTION

Embodiment 1

Figure 1:
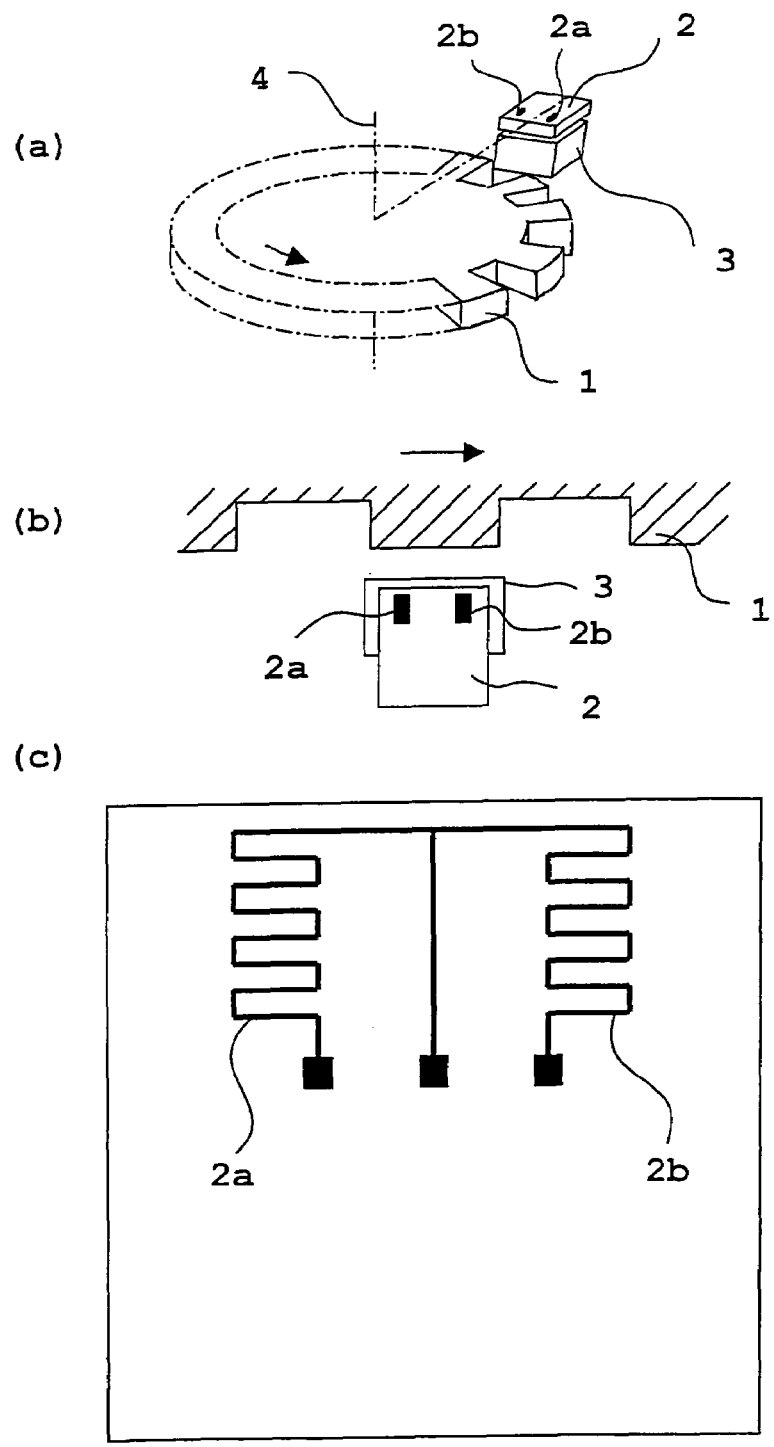
Figure 2:
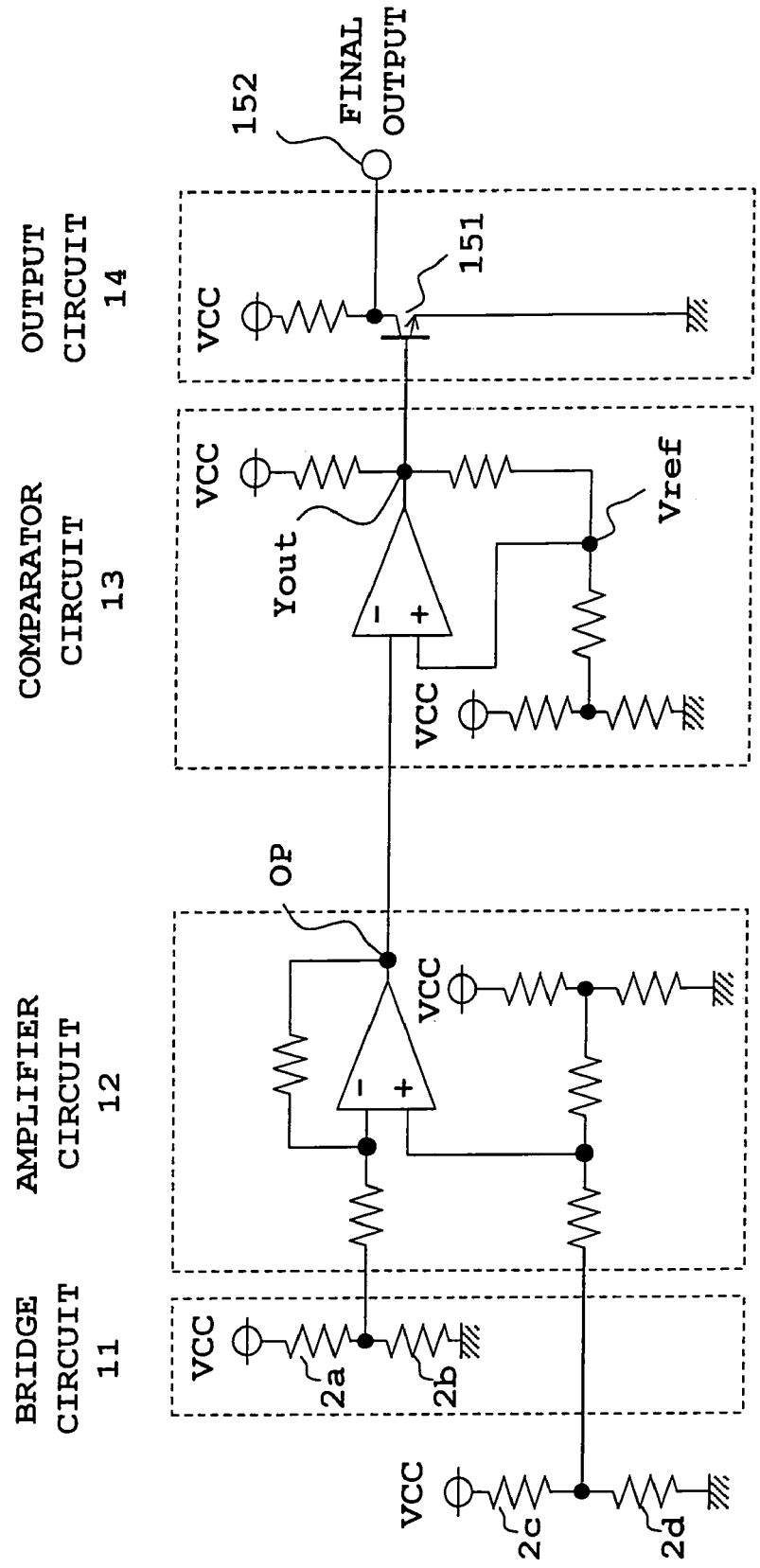
FIG. 2 is a diagram showing constitution of a processing circuit part of the conventional magnetic detector.
Figure 3:
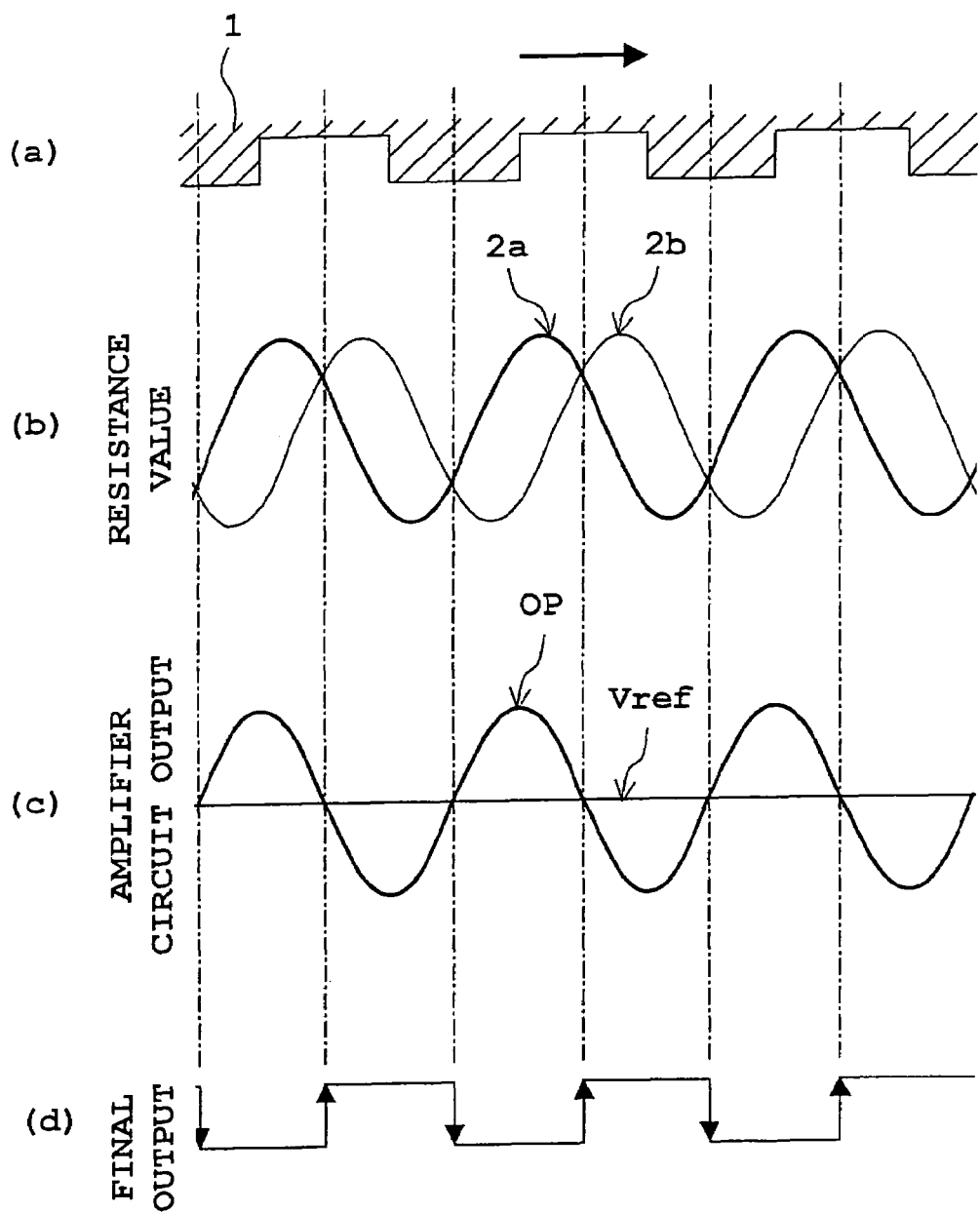
FIG. 3 is a timing chart showing the operation of the conventional magnetic detector.
Figure 4:
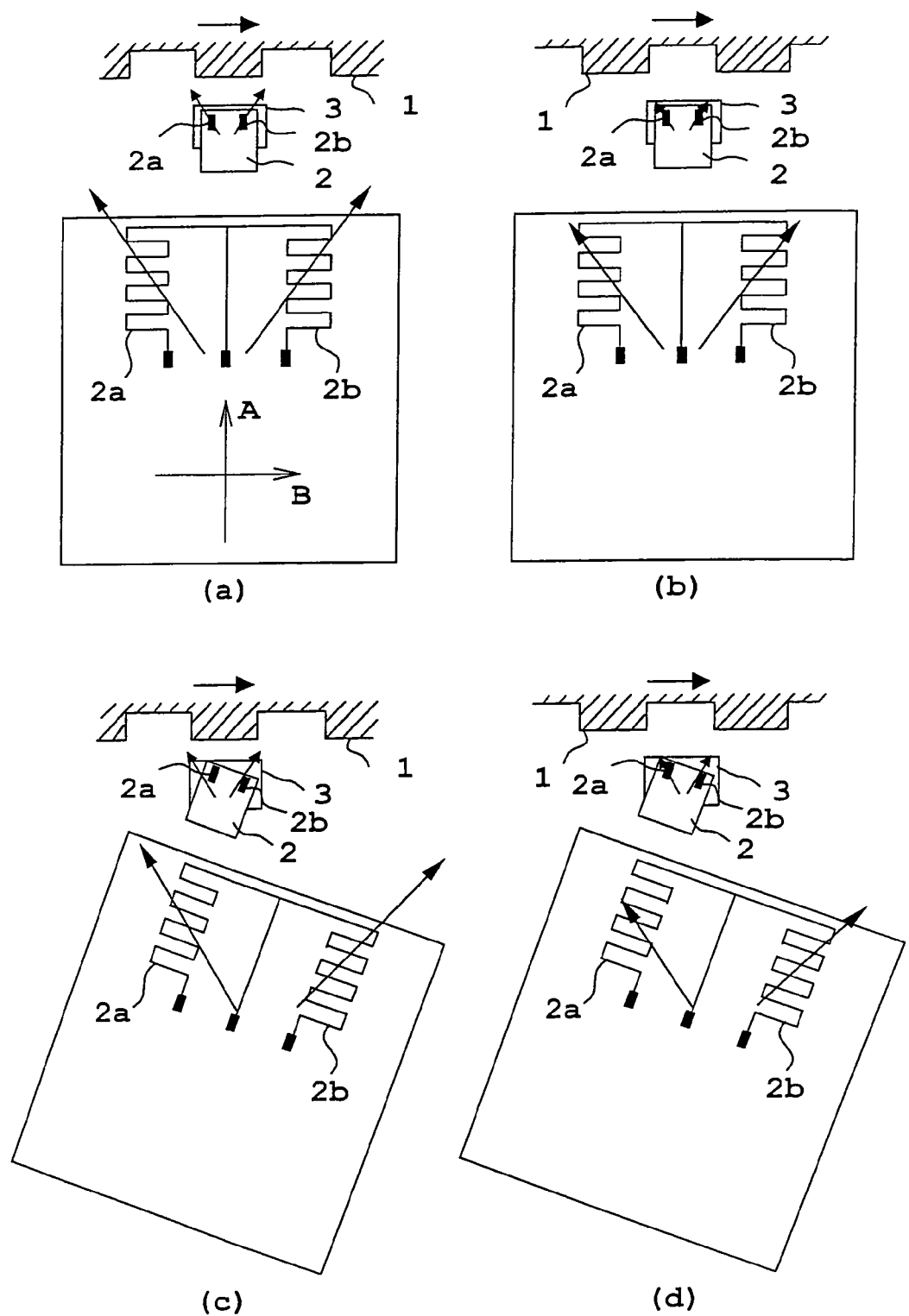
FIGS. 4(a), (b), (c) and (d) are views of the conventional magnetic detector schematically showing the cases of Figs. (a) and (b) where relative positions of the magnetic resistance segments and the magnet are in alignment with high accuracy, and the cases of Figs. (c) and (d) where relative positions thereof is out of alignment.
Figure 5:
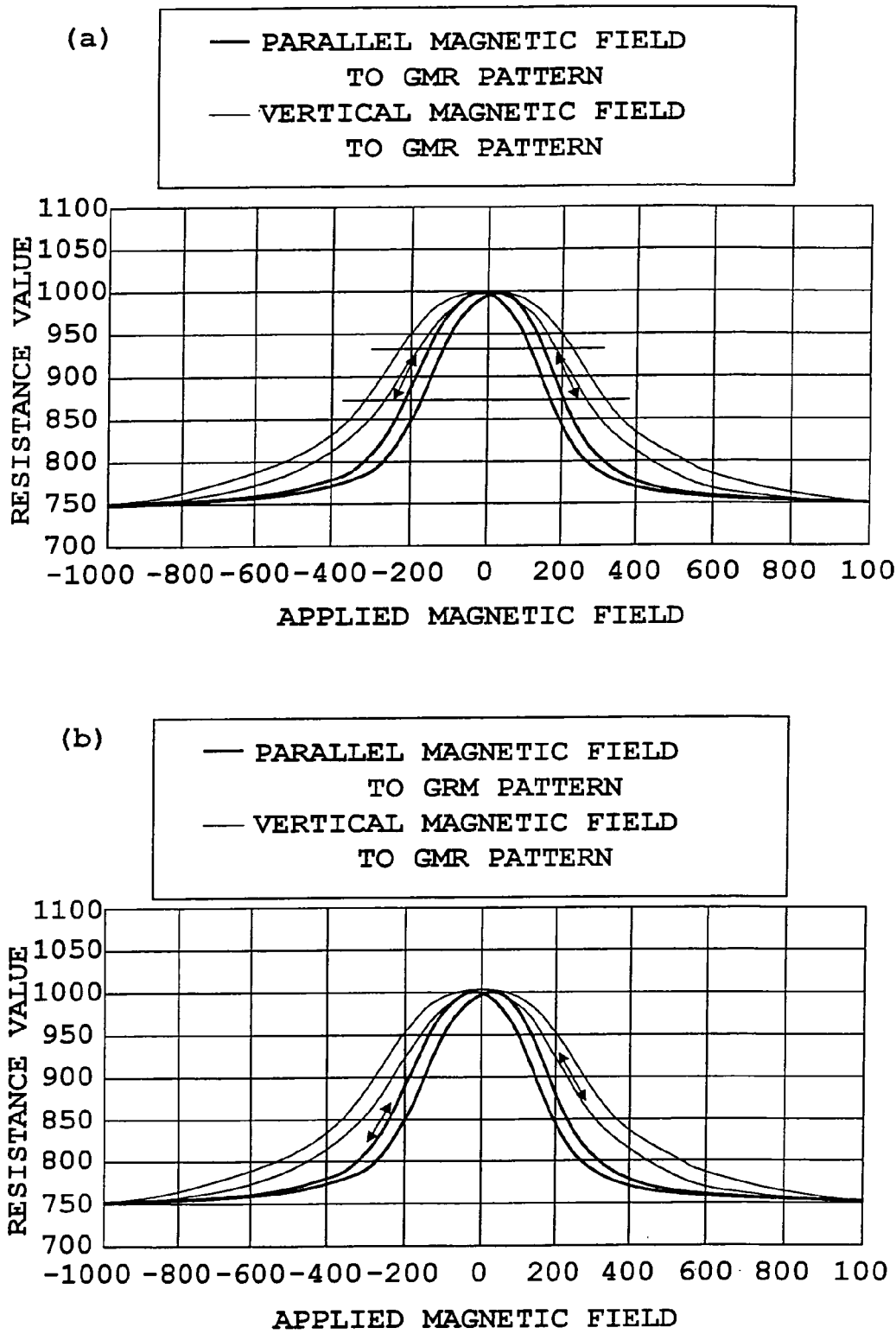
FIGS. 5(a) and (b) are graphic diagrams each showing a relation between intensity of the magnetic field and resistance value of the GMR element.
Figure 6:
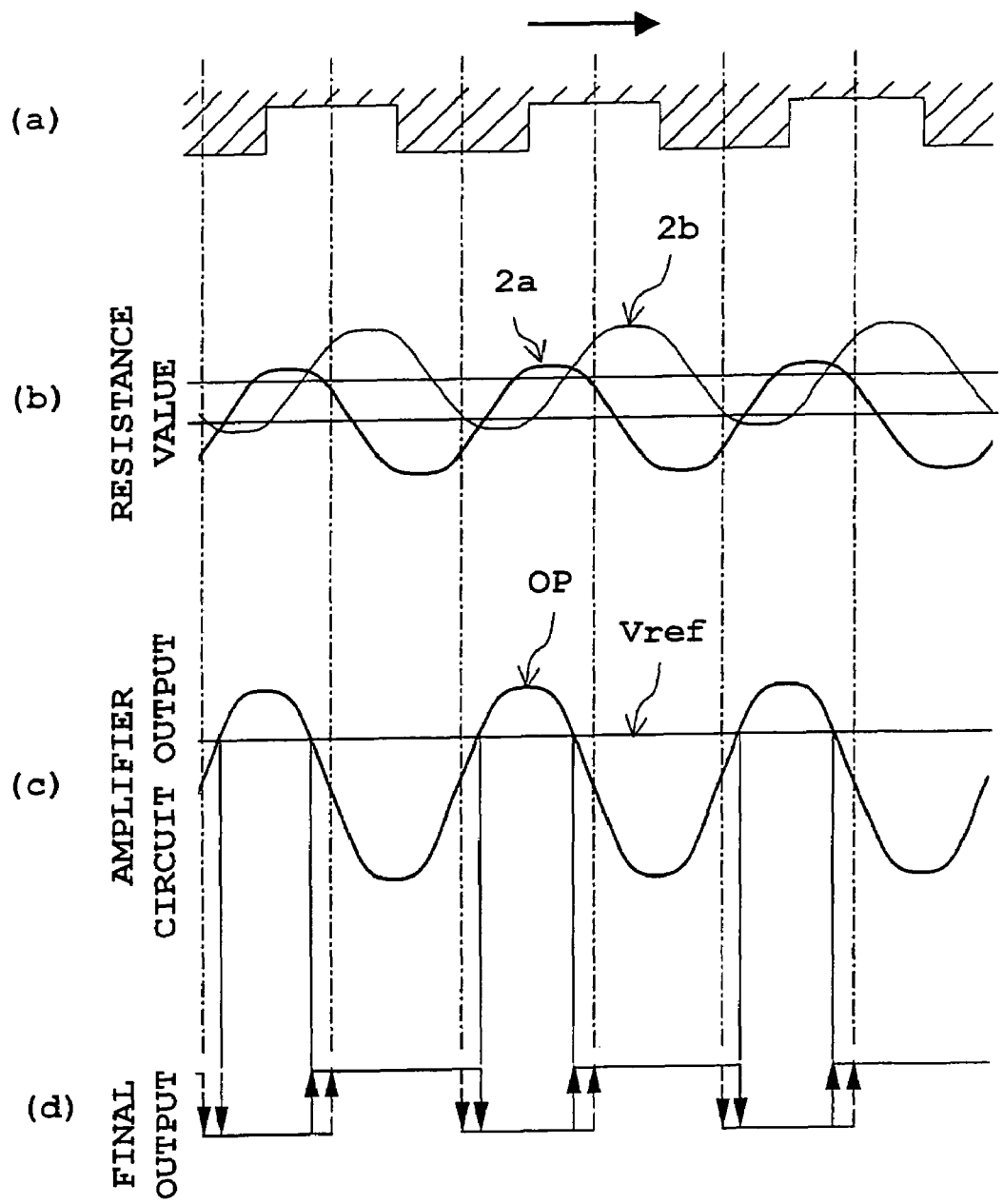
FIG. 6 shows the conventional magnetic detector, and is timing charts each showing the operation of the magnetic detector in the case where respective constitutions are out of synchronization.
Figure 7:
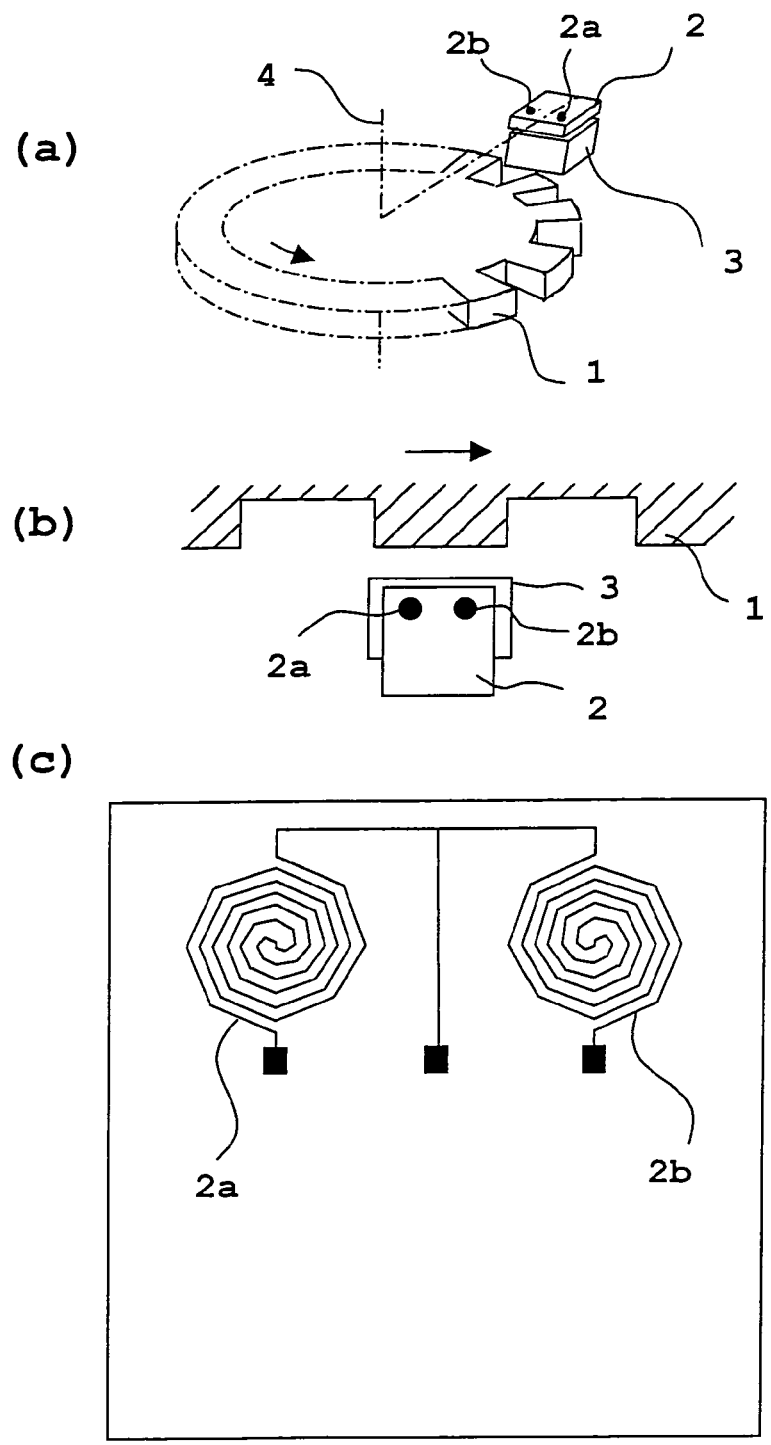

A magnetic detector according to a first preferred embodiment of the present invention is described referring to the drawings. FIGS. 7(a), (b) and (c) are views showing constitution of a magnetic detector according to the first embodiment of this invention. In the drawings, FIG. 7(a) is a perspective view, FIG. 7(b) is a top plan view, and FIG. 7(c) is an enlarged view of a magnetic resistance segment. With reference to the drawings, reference numeral 1 designates a magnetic movable body having such a shape as to change a magnetic field, for example, protrusions on a circumference of a disk. Numeral 2 designates a processing circuit part in which a circuit is printed on the surface of aboard. Numerals 2a and 2b designate magnetic resistance segments. Numeral 3 designates a magnet. Numeral 4 designates a rotation axis of the magnetic movable body 1. The movable body 1 also rotates in synchronization with the rotation of this rotation axis 4, in addition, the magnetic resistance segments 2a and 2b are indicated in one black block in FIG. 7(*b*), because each segments are densely massed and one segment cannot be illustrated independently. FIG. 7(*c*) shows an enlarged view of each magnetic resistance segment.

A shape of the magnetic resistance segment is a polygon having n-numbers of angles symmetric with respect to a point. The "n" can be any value to such a degree as to have no anisotropic properties of a shape. Supposing that n=∞, a shape thereof will be a circle. In case where a magnetic resistance segment is of a symmetric shape in a plane, the magnetic resistance segment is subjected to the application of omni-directional magnetic fields in a plane from a leading end to a trailing end of the magnetic resistance segment. That is, an in-plane magnetic field to be applied to the magnetic resistance segment, has no directional properties with respect to an arbitrarily one-directional magnetic field, and has no anisotropy.

Figure 8:
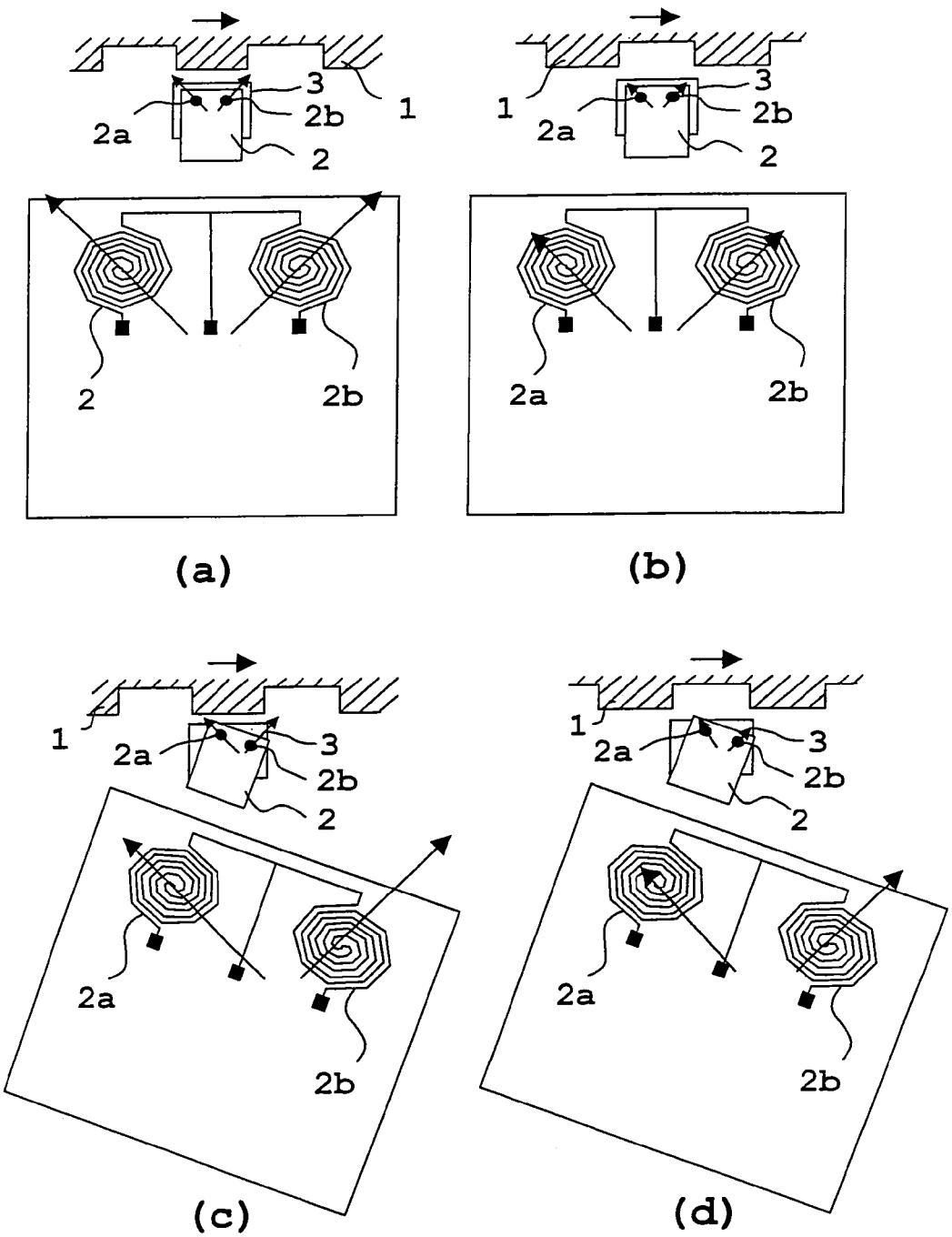
FIGS. 8(a), (b), (c) and (d) are views of the magnetic detector according to Embodiment 1 of the invention schematically showing the cases of Figs. (a) and (b) where relative positions of the magnetic resistance segments and the magnet are in alignment with high accuracy, and the cases of Figs. (c) and (d) where relative positions thereof are out of alignment.

FIGS. 8(*a*), (*b*), (*c*) and (*d*) schematically show a change in magnetic fields simulating the variation in manufacturing process. FIGS. 8(*a*) and (*b*) are examples of a magnetic detector manufactured with high accuracy. In-plane magnetic fields to be applied to the magnetic resistance segments 2a, 2b are equal or even in both of the case where the magnetic movable body 1 comes close to the magnetic resistance segments 2a, 2b and the case where the magnetic movable body 1 is apart from them. That is, a vertical magnetic field and a horizontal magnetic field in plane are equal or even. On the other hand, as shown in FIGS. 8(*c*) and (*d*), in the case where a positional relation between the magnetic resistance segments 2a, 2b and the magnet 3 is out of alignment due to variation occurred in manufacturing process, in-plane magnetic fields to be applied to the magnetic resistance segments 2a, 2b come to be as follows. That is, the magnetic resistance segment 2a has a larger horizontal magnetic field component, and the magnetic resistance segment 2b has a larger vertical magnetic field component.

However, since the magnetic resistance segment according to the first embodiment has no anisotropic properties of a shape, the magnetic resistance segments 2a, 2b are subjected to the application of omni-directional magnetic fields from a leading end to a trailing end. Therefore, there is no difference between a range of the change in resistance values of the magnetic resistance segment 2a and a range of the change in resistance values of the magnetic resistance segment 2b, resulting in no positional shift in output signals. Accordingly, in both of the case where a positional relation between the magnetic resistance segments 2a, 2b and the magnet 3 is out of alignment and the case where the positional relation is in alignment with high accuracy, waveforms thereof is synchronous.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A magnetic detector comprising:
    a magnetic field detecting part constituted of a bridge circuit, at least two sides of which include magnetic resistance elements, a magnet for applying a magnetic field to said magnetic resistance elements, a magnetic movable body for changing a magnetic field that is generated by said magnet, and a processing circuit part for outputting a signal based on change in resistance values of said magnetic resistance elements due to change in said magnetic field;
    wherein each of said magnetic resistance elements is horizontally separated and separately positioned on the processing circuit part in a direction of the rotation of the magnetic movable body and a shape of said magnetic resistance elements is symmetric with respect to a center point of each of said magnetic resistance elements.

2. The magnetic detector according to claim 1, wherein said magnetic resistance elements are constituted of a giant magnetic resistance element (GMR element).

3. The magnetic detector according to claim 1, wherein a shape of said magnetic resistance elements is a spiral pattern of polygon.

4. The magnetic detector according to claim 1, wherein said magnetic movable body is a gear-like magnetic movable body rotating in synchronization with a rotary axis.

5. The magnetic detector according to claim 1, wherein said magnetic field detecting part constitutes a bridge circuit formed of two magnetic resistance elements and only one other resistor disposed between said two magnetic resistance element.

6. A magnetic detector comprising:
    a magnetic field detecting part constituted of a bridge circuit, at least two sides of which include magnetic resistance elements, a magnet for applying a magnetic field to said magnetic resistance elements, a magnetic movable body for changing a magnetic field that is generated by said magnet, and a processing circuit part for outputting a signal based on change in resistance values of said magnetic resistance elements due to change in said magnetic field;
    wherein each of said magnetic resistance elements is separately positioned in different spaces on the processing circuit part in a direction of the rotation of the magnetic movable body and a shape of said magnetic resistance elements is symmetric with respect to a center point of each of said magnetic resistance elements.

7. A magnetic detector comprising:
    a magnetic field detecting part constituted of a bridge circuit, at least two sides of which include magnetic resistance elements, a magnet for applying a magnetic field to said magnetic resistance elements, a magnetic movable body for changing a magnetic field that is generated by said magnet, and a processing circuit part for outputting a signal based on change in resistance values of said magnetic resistance elements due to change in said magnetic field;
    wherein each of said magnetic resistance elements is separately positioned in parallel vertical planes on the processing circuit part in a direction of the rotation of the magnetic movable body and a shape of said magnetic resistance elements is symmetric with respect to a center point of each of said magnetic resistance elements.

8. A magnetic detector comprising:
    a magnetic field detecting part constituted of a bridge circuit, at least two sides of which include magnetic resistance elements, a magnet for applying a magnetic field to said magnetic resistance elements, a magnetic movable body for changing a magnetic field that is generated by said magnet, and a processing circuit part for outputting a signal based on change in resistance values of said magnetic resistance elements due to change in said magnetic field;

wherein each of said magnetic resistance elements is separately positioned in a same plane on the processing circuit part in a direction of the rotation of the magnetic movable body and a shape of said magnetic resistance elements is symmetric with respect to a center point of each of said magnetic resistance elements.

\* \* \* \* \*